United States Patent

[11] 3,615,597

| [72] | Inventors | Jack R. Durst |
| | | Osseo; |
| | | Merlin J. Sletten, St. Paul, both of Minn. |
| [21] | Appl. No. | 622,036 |
| [22] | Filed | Mar. 10, 1967 |
| [45] | Patented | Oct. 26, 1971 |
| [73] | Assignee | The Pillsbury Company |
| | | Minneapolis, Minn. |

[54] SOLID FOOD CONDIMENT
14 Claims, No Drawings

| [52] | U.S. Cl. | 99/140 R, |
| | | 99/DIG. 3 |
| [51] | Int. Cl. | A23l 1/22 |
| [50] | Field of Search | 99/140, |
| | | 134, 166, 204, DIG. 3, 138 |

[56] References Cited
UNITED STATES PATENTS

| 2,477,742 | 8/1949 | Hall | 99/166 |
| 2,876,106 | 3/1959 | Jucaitis et al. | 99/141 |
| 2,912,338 | 11/1959 | Barnes et al. | 99/204 |
| 2,926,121 | 2/1960 | Hobbs et al. | 167/82 |
| 3,018,183 | 1/1962 | Downey | 99/134 |
| 3,100,909 | 8/1963 | Schapiro | 99/78 |
| 3,434,843 | 3/1969 | Durst | 99/1 |
| 3,336,139 | 8/1967 | Mech et al. | 99/124 |

*Primary Examiner*—Morris O. Wolk
*Assistant Examiner*—Warren Bovee
*Attorneys*—Ronald E. Lund and James V. Harmon

ABSTRACT: Compact, solid food condiment pieces which are resistant to physical, chemical and bacteriological degradation are provided by a unitary, solid condiment piece consisting essentially of a matrix comprised of a hydrophilic film former, water and an edible humectant and at least one edible condiment uniformly distributed within the matrix. The condiment is present in the matrix in an amount greater than incidental impurities but sufficient to impart a pronounced condimental taste to the condiment piece. Moisture level for the condiment pieces is less than 20 but more than about 7 weight percent.

SOLID FOOD CONDIMENT

This invention relates, in general, to unitary food condiments and, more particularly, flexible food condiments which are of unitary construction which are stable against degradation.

Conventionally, food condiments such as barbecue sauce, tomato catsup, tomato chili sauce, cranberry-orange relish, horseradish, mustard and the like are distributed in a semiliquid form in a sealed container. A major portion of the condiments is water. This manner of providing condiments is rather costly since considerable added costs are incurred from maintaining sanitation, bottling or canning the condiments and as well as container costs. Additional costs result from transporting the container and contents which comprises mostly water.

An object of the present invention is to provide a solid condiment which without the benefit of a sealed container is shelf stable.

Another object of the invention is to provide a solid condiment that possesses improved resistance against physical, chemical and bacteriological degradation.

According to the present invention there is provided a flexible, solid condiment piece consisting essentially of a matrix comprised of water in amount greater than about 7 less than 20 weight percent of the total condiment piece weight, about 1 to about 70 parts by weight humectant and 10 parts by weight hydrophilic film formers, said matrix having uniformly distributed therein at least one edible condiment in an amount greater than incidental/impurities and sufficient to impart a condiment flavor to said piece.

The condiment food units of the present invention are characterized by flexibility, impact strength against shattering, a relatively low hygroscopicity and a low permeability to gases and moisture. The condiments are stable against substantial reduction or increased flexibility when subjected to humidity conditions of the surrounding atmosphere. In addition, the condiments are not deformed and retain a solid identity when subjected to elevated temperatures (e.g., 100° F.). These condiments need not be packaged in a sealed container and are relatively stable against substantial reduction in the condiment flavor. Moreover, the present condiments are relatively stable against physical, bacteriological and chemical decomposition.

Examples of suitable edible hydrophilic film forming substances for the matrix include egg albumin, human serum albumin, sodium proteinate of soybean, wheat germ, gelatin, sodium caseinate, nonfat milk solids, whole egg, pea flour, bean flour, corn germ, gelatinized starch, carboxymethyl cellulose, sodium carboxymethyl cellulose, agar agar, fish protein, gelsoy (soybean protein), whey, dextran, dextrins, bran protein, polyvinyl alcohol, polyvinylpyrrolidine, calcium alginate, potassium alginate, sodium alginate, carrageenan and salts thereof, hydroxypropyl cellulose, methyl cellulose, methyl ethyl cellulose, pectin, gum acacia, locust bean gum, gum ghatti, guar gum, gum karaya, oat gum, gum tragacanth, mixtures thereof and the like.

In addition to the edible film-forming substances, the matrix contains water and an edible humectant. The edible humectants employed herein have an affinity for water and maintain a narrow range moisture content fluctuation when exposed to a wide range of humidity. In general, the edible humectants adaptable herein exhibit either solid or liquid properties (i.e., nongaseous) at temperatures in excess of 300° F. at 760 mm. pressure. Preferably those humectants which are solid or liquid at 760 mm. pressure at 350° F. or above are employed. Suitable humectants which are normally liquid at room temperature but possess a definitive boiling point are glycerin and propylene glycol. These normally liquid humectants provide a permanent plasticizing effect and are preferably employed herein as the humectant component. Other materials which exhibit humectant properties are those which in the dry form decompose at elevated temperatures rather than volatilizing. Suitable solid humectants include the dry solids of invert sugar containing materials such as molasses, honey, brown sugar, papylon, fruit juices, starch hydrolyzates (e.g., corn syrup), sorghum, etc., as well as the aqueous solutions thereof and the invert sugar. Other solid humectants include edible materials as calcium chloride, fructose, maltose, sorbitol and the like. The amount of humectant contained in the external phase broadly ranges from at least 1 part by weight to about 70 parts by weight humectant for each 10 parts by weight hydrophilic film former.

In addition to the aforementioned humectants, the matrix contains water in an amount ranging from at least 1 part by weight to about 70 parts by weight water for each 10 parts by weight hydrophilic film former therein. A substantial portion of the water may be provided in the matrix, if desired, by the employment of humectants such as honey, molasses, starch hydrolyzate syrups, cane juice, inverted fruit juices and the like. Advantageously, the amount of water and edible humectant to hydrophilic film former in the matrix respectively ranges from about 5 to about 15 and 3 to about 35 parts by weight for each 10 parts by weight hydrophilic film former.

The condiments incorporated into the matrix include naturally occurring condiments as well as the chemical compounds which impart condiment flavoring. Illustrative naturally occurring food products and extracts thereof containing condiments are peppermint, anise, bay and bay-leaves extract, garlic, leek, mustard, horseradish, calamus, citronells, ginger, lemon, mandarin, myrtle, petitgrain, ho, iva herb extract, beef extracts, zedoary-bark extract, ditanny of crete, oregano, lovage, marjoram, origanum, savory, cloves, black currant buds, yarrow herb, allspice, black pepper, mushroom, cassia-bark extract, cassia, cinnamon bark, cinnamon-root oil, cumin, coriander, basil, estragon, pimento, laurel leaves, lavender, lavandin, cascarilla-bark extract, celery seed, angelica root, asafoetida, coriander, lime, orange leaf (absolute), cardamom, peels of citrus macrocarpa bunge and erigeron.

Exemplary chemical compounds which impart condiment flavoring that can be incorporated into the matrix include acetaldehyde, acetic acid, allyl disulfide, allyl isothiocyanate, allyl, mercaptan, allyl sulfide, ammonium sulfide, amyl 2-furoate, d-camphor, carvacrol, $\beta$-caryophyllene, caryophyllene alcohol, cinnamaldehyde, cinnamaldehyde ethylene glycol acetal, cinnamyl acetate, cinnamyl benzoate, citral diethyl acetal, cuminaldehyde, p-cymene, dihydrocarvyl acetate, dipropyl disulfide, estragole, eugenol, isoeugenol, eugenyl acetate, eugenyl formate, isoeugenyl formate, heptanal dimethyl acetal, heptanal glyceryl acetal, 2-heptanone, hexanoic acid, p-methylanisole, methyl cinnamate, methyl disulfide, methyl 2-furoate, methyl 2-nonynoate, 2-methylthiopropionaldenyde, monosodium glutamate, 3-nonanon-1-yl acetate nonanoyl 4-hydroxy- 3-methoxybenzylamide, octanoic acid, 3-octanon1-01, 1-octen-3-ol, oleic acid, palmitic acid, 3-phenylpropyl acetate, $\alpha$-pinene, piperidine, propyl 2-furoate, salicylaldehyde, tartaric acid, $\alpha$-terpineol, terpinyl acetate and p-tolyl acetate.

The amount of condiment and type incorporated into the matrix will depend largely upon the desired condiment product and the flavor potency of the condiment (e.g., potency of the chemical compounds is generally greater than the naturally occurring condiments.). The condiments are uniformly distributed throughout the matrix in a manner such that it cannot be identified by macroscopic examination. An effective amount of condiment ranges from more than incidental impurities to about 80 weight percent by weight of the condiment piece. Most generally the amount of condiment is greater than 0.5 percent by weight of condiment piece.

Depending upon the desired product, various other conventional ingredients in varying amounts may be included in the present condiments. Typical other conventional ingredients include preservatives, antioxidants, firming agents, flavoring surface active agents and coloring agents such as those disclosed in *Chemicals Used in Food Processing*, publication 1274 by the National Academy of Sciences, et. al., pages 49–53 and 65–258.

The condiment pieces of the present invention are prepared by providing a uniform admixture of the hydrophilic film former, edible humectant and condiment in the amounts hereinbefore described along with a sufficient amount of water to insure a uniform admixture. The admixing may be conducted in any conventional high-speed food mixer such as a Waring blender, a standard householder mixer, a Hobart mixer, etc. Conventionally processed condiments such as mustard, catsup, chili sauce, barbecue sauce and the like usually contain sufficient water; thus not necessitating the addition of more water. Advantageously, the amount of water employed ranges from about 10 to about 90 percent by weight of the total solid content of the admixture.

After the uniform admixture has been formed, the admixture is then dried in a manner such that the resultant product has a moisture content of at least about 7 weight percent and generally less than about 20 weight percent. Exceptional condiment pieces are provided when the moisture level ranges from about 8 to about 15 percent by weight. In conjunction with the edible humectants, it has been discovered that the condiment food pieces, at a moisture level of about 9 to about 12 weight percent are equilibrated to a moisture level which is substantially shelf stable against further changes when the condiment pieces are subjected to abnormal humidity and temperature conditions.

The condiments of the present invention can be provided in various sizes and shapes such as cubes, sheets, bars, rods, etc. The condiments are of unitary construction in that any of the given food pieces (e.g., 600 milligram portion) will have substantially the same uniform distribution of food constituents as another portion thereof. In general, the specific density of the condiments is greater than 1.1 grams per cubic centimeter and most generally in the range of about 1.2 to about 1.5 grams per cubic centimeter.

Illustrative condiment pieces with a pronounced condiment flavor are condiment pieces such as barbecue sauce, chili sauce, soya sauce, pickle relish, garlic, molasses, onion, apple butter, mustard, meat extract, etc. In addition to the hereinafter examples, further exemplary condiment pieces pursuant to the present invention are disclosed in Technical Report FD-29 entitled *Food Adjuncts Stabilized as Thin Sheets or Laminates* by Jack R. Durst and published by U.S. Natick Laboratories.

The following examples are illustrative of the invention:

EXAMPLE I - CATSUP FOOD SHEET 29.7 pounds of conventionally processed catsup was placed in a Schnellkutter mixer and 0.3 pounds sodium carboxymethyl cellulose was added thereto and mixed at a high speed until thoroughly dispersed (about 5 minutes). The admixture was frozen and sliced into sheets of 3/32 -inch thickness and 4 inches square. The sheets were placed on release paper dried in an air-circulating oven set at 70° C. for 3 hours, turned over and dried for an additional one-half hour.

The resultant catsup sheets were dusted with rice flour. The sheets were flexible and fairly easy to bite and chew with a pronounced catsup flavor.

EXAMPLE II - VINEGAR FOOD SHEETS

The following ingredients and amounts thereof were employed in making vinegar food sheets:

| Ingredients | Parts by Weight |
| --- | --- |
| defatted coconut flour | 12.00 |
| vinegar | 66.50 |
| sodium carboxymethyl cellulose | 1.00 |
| citric acid | 2.50 |
| sorbitol | 3.00 |
| corn syrup solids | 15.00 |

The vinegar food sheets were prepared by first dissolving the sodium carboxymethyl cellulose in water with the aid of a Waring Blender. The remaining ingredients were then admixed and homogeneously dispersed therein by the Waring Blender operated at a high speed. The resultant homogeneous admixture was poured directly on large sheets of polyethylene and air dried overnight at a temperature of 72° F. and 35 percent relative humidity. The sheets, after drying, were then cut into 4 -inch by 4 -inch by ⅛-inch sheets. The resultant product was a flexible food sheet with a pronounced vinegar taste.

EXAMPLE III - APPLE BUTTER FOOD SHEETS

The following ingredients and amounts thereof were employed in making apple butter food sheets:

| Ingredients | Parts by Weight |
| --- | --- |
| sodium carboxymethyl cellulose | 0.25 |
| gelatin | 1.00 |
| apple butter | 98.75 |

In preparing the apple butter food sheets, the apple butter was heated to 130° F. and placed in a Waring Blender. The gelatin was added to the apple butter while simultaneously maintaining the Waring Blender at a high speed. The sodium carboxymethyl cellulose was then added to the admixture and mixing was continued at a high speed for an additional 5 minutes. The resultant product was frozen and sliced into food sheets of 3 thirty-second inches in thickness and dried on release paper for 4 hours in an air circulating oven set at 70° C. followed by additional drying at 72° F. and 35 percent relative humidity for 8 hours. The resultant apple butter food sheets were flexible, easy to bite and chew with a good apple butter taste.

EXAMPLE IV - ONION FOOD SHEETS

The following ingredients and amounts thereof were employed in making onion food sheets:

| Ingredients | Parts by Weight |
| --- | --- |
| dried onion flakes | 10.00 |
| corn syrup solids | 15.00 |
| defatted coconut flour | 10.00 |
| sorbitol | 4.00 |
| sodium carboxymethyl cellulose | 1.00 |
| water | 60.00 |

Employing a method similar to that disclosed in example II, onion food sheets were prepared. The resultant food sheets were flexible with a pronounced onion taste.

EXAMPLE V - MUSTARD FOOD SHEETS

The following ingredients and amounts thereof were employed in making mustard food sheets:

| Ingredients | Parts by Weight |
| --- | --- |
| prepared mustard | 78.40 |
| corn syrup solids | 11.80 |
| glycerin | 1.87 |
| sodium carboxymethyl cellulose | 0.23 |
| water | 7.70 |

The mustard food sheets were prepared by admixing the aforementioned ingredients and amounts thereof in a Waring Blender operated at a high speed, thus providing a homogeneous and smooth admixture of the ingredients. The admixture was then heated to 145° F. and mixed 2 minutes under a vacuum to remove any entrapped air. The resultant product was poured into a 4 -inch by 4 -inch by 10 -inch polyethylene mold and frozen. The resultant frozen product was then sliced into sheets of a three thirty-second -inch thickness. The resultant sheets were then placed on a polyethylene tray and air dried for 24 hours at 72° F. and a relative humidity of 35 percent. The resultant sheets were flexible with a pronounced mustard taste and odor.

EXAMPLE VI - PICKLE RELISH FOOD SHEETS

Pickle relish food sheets were prepared in accordance with the method of example I employing 94 parts by weight pickle relish, 4 parts by weight corn syrup solids and 2 parts by weight sodium carboxymethyl cellulose.

The resultant sheets were flexible with a pronounced pickle relish taste.

EXAMPLE VII - COMPARATIVE DATA

The food sheets prepared in accordance with examples I through VI were tested in respect to the chemical, bacteriological and physical properties. For the storage study, 6 sheets were placed into metallized pouches (0.5 mil—0.5 mil aluminum foil and 3 mil polyolefin). For the samples packed under nitrogen, pouches were sealed on a flex-pack automatic sealer at 500° F. with nitrogen set at 50 lbs. per sq. in. For the air pack variables, the pouches were packed on a robot bar sealed at 275° F. holding for 2 seconds.

For the storage stability tests for the food sheets, the following variables were used:

1. Temperature at 100° F., 73° F., 40° F. and cycling twice a week alternating between 40° F. and 0° F.
2. Atmospheres—one nitrogen, the other regular atmospheric air.
3. Time periods of 0, 2 weeks, 4 weeks, 8 weeks and 13 weeks.
4. Tests conducted on the items at 0 weeks, 4 weeks, 8 weeks and 13 weeks were:
   a. Chemical—moisture and pH on initial and air packs at 40° F., 73° F. at 2 weeks, 4 weeks, 8 weeks and 13 weeks;
   b. Bacteriogical—total count coliforms, molds and yeast on initial and on air and nitrogen packs at 100° F. and 4 weeks, 8 weeks and 13 weeks.

Tables I through IV set forth the test results.

TABLE I

Moisture and pH results for food sheets stored 0, 2 and 4 weeks

| Food sheet | 0 weeks | | 2 week air storage | | | | 4 week air storage | | | |
|---|---|---|---|---|---|---|---|---|---|---|
| | Moisture | pH | Moisture | | pH | | Moisture | | pH | |
| | | | 40° F. | 73° F. | 40° F. | 73° F. | 40° F. | 73° F. | 40° F. | 73° F |
| Catsup—Ex. I | 11.16 | 4.00 | 11.97 | 7.37 | 4.3 | 4.2 | 11.63 | 0.36 | 3.90 | 4.10 |
| Pickle relish—Ex. VI | 16.25 | 3.80 | 14.82 | 15.58 | 3.9 | 4.0 | 15.26 | 15.16 | 3.60 | 3.65 |
| Vinegar—Ex. II | 10.52 | 4.00 | | | | | | 7.69 | | 4.00 |
| Apple butter—Ex. III | | | 9.37 | 9.38 | 4.0 | 4.15 | 9.15 | 10.09 | 3.55 | 3.30 |
| Onion—Ex. IV | 8.32 | 6.10 | | | | | | 8.08 | | 6.10 |
| Mustard—Ex. V | 8.33 | 4.25 | | | | | | 8.02 | | 4.35 |

TABLE II

Moisture and pH results for food sheets stored 8 and 13 weeks

| Food sheet | 8 week air storage | | | | 13 week air storage | | | |
|---|---|---|---|---|---|---|---|---|
| | Moisture | | pH | | Moisture | | pH | |
| | 40° F. | 73° F. | 40° F. | 73° F. | 40° F. | 73° F. | 40° F. | 73° F. |
| Catsup—Ex. I | 13.63 | 7.15 | 4.10 | 4.10 | 8.74 | 10.80 | 4.25 | 4.30 |
| Vinegar—Ex. II | | | | | | 9.61 | | 4.00 |
| Apple butter—Ex. III | 8.76 | 8.57 | 3.55 | 3.80 | | 9.56 | | 4.10 |
| Onion—Ex. IV | | | | | | 7.83 | | 6.10 |
| Mustard—Ex. V | | | | | | 7.88 | | 4.60 |
| Pickle relish—Ex. VI | 14.26 | 14.91 | 3.90 | 3.90 | 16.17 | 15.82 | 4.0 | 4.0 |

TABLE III

Initial and four week microbiological analysis of food sheets

| | Initial | | | 4 weeks at 100° F. | | | | | |
|---|---|---|---|---|---|---|---|---|---|
| | | | | Air pak | | | Nitrogen pak | | |
| Food sheet | Total bact. count/gm. | Presumptive coliform count/gm. | Mold and yeast count/gm. | Total bact. count/gm. | Presumptive coliform count/gm. | Mold and yeast count/gm. | Total bact. count/gm. | Presumptive coliform count/gm. | Mold and yeast count/gm. |
| Catsup—Ex. I | 50 | <10 | 30 | 140 | <10 | <10 | 120 | <10 | <10 |
| Vinegar—Ex. II | 40 | <10 | 20 | 20 | <10 | <10 | | | |
| Apple butter—Ex. III | | | | 400 | <10 | <10 | 200 | <10 | <10 |
| Onion—Ex. IV | 70 | <10 | 40 | 420 | <10 | <10 | | | |
| Mustard—Ex. V | <3,000 | <10 | <3,000 | 720 | <10 | <10 | | | |
| Pickle relish—Ex. VI | 1,750 | <10 | 40 | 1,830 | <10 | <10 | 100 | <10 | <10 |

TABLE IV

Eight week and thirteen week microbiological analysis of food sheets

| | 8 weeks at 100° F. | | | | | | 13 weeks at 100° F. | | | | | |
| --- | --- | --- | --- | --- | --- | --- | --- | --- | --- | --- | --- | --- |
| | Air pak | | | Nitrogen pak | | | Air pak | | | Nitrogen pak | | |
| Food sheet | Total bact. count/gm. | Presumptive coliform count/gm. | Mold and yeast count/gm. | Total bact. count/gm. | Presumptive coliform count/gm. | Mold and yeast count/gm. | Total bact. count/gm. | Presumptive coliform count/gm. | Mold and yeast count/gm. | Total bact. count/gm. | Presumptive coliform count/gm. | Mold and yeast count/gm. |
| Catsup—Ex. I | 10 | <10 | <10 | <10 | <10 | <10 | 60 | <10 | <10 | 40 | <10 | <10 |
| Vinegar—Ex. II | | | | | | | <10 | <10 | <10 | | | |
| Apple butter—Ex. III | 30 | <10 | 70 | 20 | <10 | <10 | <10 | <10 | <10 | <10 | <10 | <10 |
| Onion—Ex. IV | | | | | | | 400 | <10 | <10 | | | |
| Mustard—Ex. V | | | | | | | 1,520 | <10 | <10 | | | |
| Pickle relish—Ex. VI | 300 | 710 | 710 | 20 | 710 | 710 | 10 | <10 | <10 | <10 | <10 | <10 |

What is claimed is:

1. A flexible, solid condiment food piece having the characteristic of retaining a solid identity when exposed to a temperature of 70° C. with the food piece being of unitary construction in that any given 600 milligram portion thereof has substantially the same uniform distribution of food constituents as another portion thereof, said condiment food piece consisting essentially of a matrix containing water in an amount greater than about 7 and less than 20 percent of the total condiment piece weight, an edible humectant and at least one hydrophilic film former, said humectant being present in the food piece in an amount ranging from about 1 to about 70 parts by weight humectant for each 10 parts by weight hydrophilic film former, said matrix having uniformly distributed therein at least 1 edible condiment in an amount greater than incidental impurities and sufficient to impart a condiment flavor to said piece.

2. The condiment piece according to claim 1 wherein the edible humectant has a boiling point and decomposition temperature in excess of 300° F.

3. The condiment piece according to claim 2 wherein the edible condiment is a member selected from the group consisting of horseradish, mustard, catsup, chili sauce, barbecue sauce, vinegar, onion, pickle relish and hickory smoked flavor.

4. The condiment piece according to claim 3 wherein the edible condiment is mustard.

5. The condiment piece according to claim 3 wherein the edible condiment is catsup.

6. The condiment piece according to claim 3 wherein the edible condiment is pickle relish.

7. The condiment piece according to claim 3 wherein the edible condiment is chili sauce.

8. The condiment piece according to claim 3 wherein the edible condiment is barbecue sauce.

9. The condiment piece according to claim 2 wherein the amount of humectant ranges from about 3 parts by weight to about 35 parts by weight humectant for each 10 parts by weight hydrophilic film former.

10. The condiment piece according to claim 9 wherein the amount of water contained therein ranges from about 8 to about 16 weight percent of the total condiment piece weight.

11. The condiment piece according to claim 10 wherein the edible condiment ranges from about 0.5 percent to about 80 percent of the total condiment piece weight.

12. The condiment piece according to claim 11 wherein a major portion of the humectant is corn syrup.

13. The condiment piece according to claim 11 wherein a major portion of the humectant is provided by at least 1 member selected from the group consisting of glycerin and propylene glycol.

14. The condiment piece according to claim 12 wherein at least a minor portion of the humectant is provided by a member selected from the group consisting of glycerin and propylene glycol.